(12) United States Patent
Chiaro et al.

(10) Patent No.: US 11,247,202 B2
(45) Date of Patent: Feb. 15, 2022

(54) CATALYST FOR SELECTIVE HYDRODESULPHURIZATION OF CRACKED NAPHTHA STREAMS, METHOD OF PREPARATION THEREOF, AND PROCESS FOR SELECTIVE HYDRODESULPHURIZATION OF CRACKED NAPHTHA

(71) Applicant: PETRÓLEO BRASILEIRO S.A.-PETROBRAS, Rio de Janeiro (BR)

(72) Inventors: Sandra Shirley Ximeno Chiaro, Rio de Janeiro (BR); Jose Luiz Zotin, Rio de Janeiro (BR); Dayse Lovatte Fonseca, Itaipu (BR); Anilza de Almeida Lyra Correa, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 16/753,985

(22) PCT Filed: Oct. 4, 2018

(86) PCT No.: PCT/GB2018/052831
§ 371 (c)(1),
(2) Date: Apr. 6, 2020

(87) PCT Pub. No.: WO2019/069080
PCT Pub. Date: Apr. 11, 2019

(65) Prior Publication Data
US 2020/0391189 A1 Dec. 17, 2020

(30) Foreign Application Priority Data
Oct. 6, 2017 (BR) ................... 10 2017 021445-1

(51) Int. Cl.
| | | |
|---|---|---|
| *B01J 35/00* | (2006.01) | |
| *B01J 23/88* | (2006.01) | |
| *B01J 37/02* | (2006.01) | |
| *C10G 45/08* | (2006.01) | |
| *B01J 23/882* | (2006.01) | |
| *B01J 23/887* | (2006.01) | |
| *B01J 35/10* | (2006.01) | |
| *B01J 37/08* | (2006.01) | |

(52) U.S. Cl.
CPC ......... *B01J 35/0073* (2013.01); *B01J 23/882* (2013.01); *B01J 23/8872* (2013.01); *B01J 35/006* (2013.01); *B01J 35/0053* (2013.01); *B01J 35/1019* (2013.01); *B01J 35/1038* (2013.01); *B01J 35/1042* (2013.01); *B01J 35/1061* (2013.01); *B01J 37/0201* (2013.01); *B01J 37/0236* (2013.01); *B01J 37/088* (2013.01); *C10G 45/08* (2013.01); *C10G 2300/1044* (2013.01); *C10G 2300/202* (2013.01); *C10G 2300/308* (2013.01); *C10G 2300/4006* (2013.01); *C10G 2300/4012* (2013.01); *C10G 2300/4018* (2013.01)

(58) Field of Classification Search
CPC ..... C10G 45/08; B01J 23/882; B01J 23/8872; B01J 35/0073; B01J 37/0201
See application file for complete search history.

(56) References Cited

U.S. PATENT DOCUMENTS

| | | | |
|---|---|---|---|
| 4,132,632 A | 1/1979 | Yu et al. | |
| 4,140,626 A | 2/1979 | Bertolacini et al. | |
| 5,340,466 A * | 8/1994 | Dai ........................ | C10G 45/08 208/216 PP |
| 5,348,928 A | 9/1994 | Kukes et al. | |
| 5,358,633 A | 10/1994 | Dai et al. | |
| 5,423,976 A | 6/1995 | Sudhakar et al. | |
| 5,441,630 A | 8/1995 | Dai et al. | |
| 5,459,118 A | 10/1995 | Dai et al. | |
| 5,770,046 A * | 6/1998 | Sudhakar ............. | B01J 23/8872 208/143 |
| 5,851,382 A | 12/1998 | Sudhakar | |
| 5,985,136 A | 11/1999 | Brignac et al. | |
| 6,013,598 A | 1/2000 | Lapinski et al. | |
| 6,692,635 B2 | 2/2004 | Didillon et al. | |

FOREIGN PATENT DOCUMENTS

CN 104588028 B 2/2017

OTHER PUBLICATIONS

International Search Report, dated Dec. 19, 2018, for International Application No. PCT/GB2018/052831.
Zhao et al., "Synthesis, Characterization, and Application of Hydotalcites in Hydrodesulfurization of FCC Gasoline," Fuel Processing Technology, vol. 81, No. 3, May 25, 2003, pp. 201-209.

* cited by examiner

*Primary Examiner* — Renee Robinson
(74) *Attorney, Agent, or Firm* — Birch, Stewart, Kolasch & Birch, LLP

(57) ABSTRACT

The present invention relates to a catalyst for selective hydrodesulphurization of cracked naphtha streams in the form of an extrudate, which comprises a support based on an inorganic oxide and an outer layer bound to the support, wherein the outer layer comprises desulphurization metals dispersed therein forming a crown, the desulphurization metals being cobalt and molybdenum. The present invention also relates to the preparation of said catalyst by the incipient wetness impregnation method and to the process for selective hydrodesulphurization of cracked naphtha employing same.

15 Claims, 4 Drawing Sheets

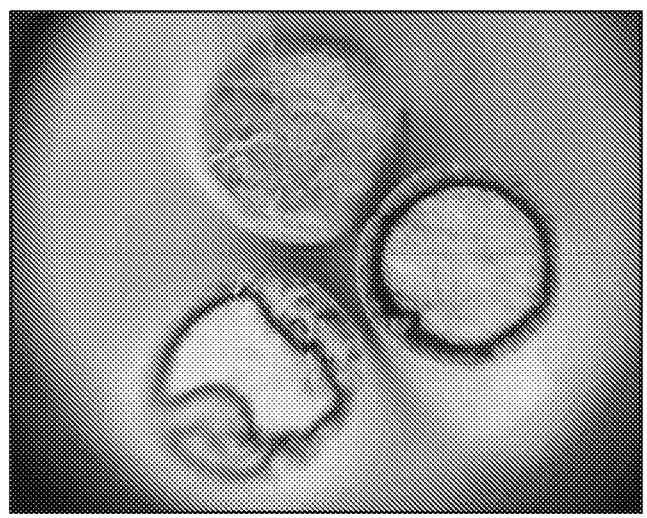
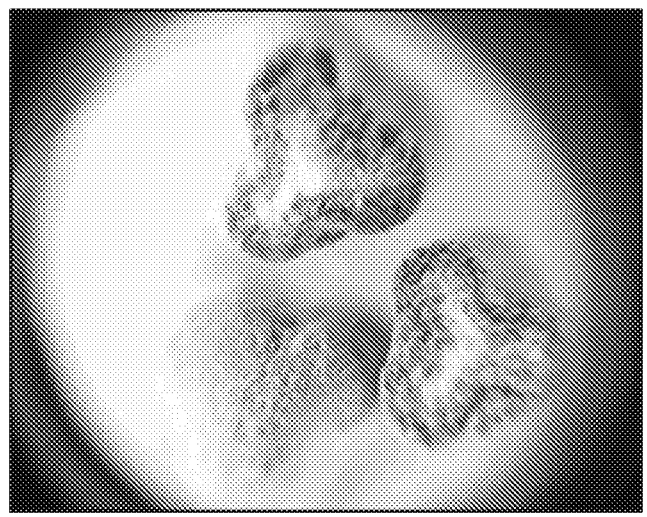
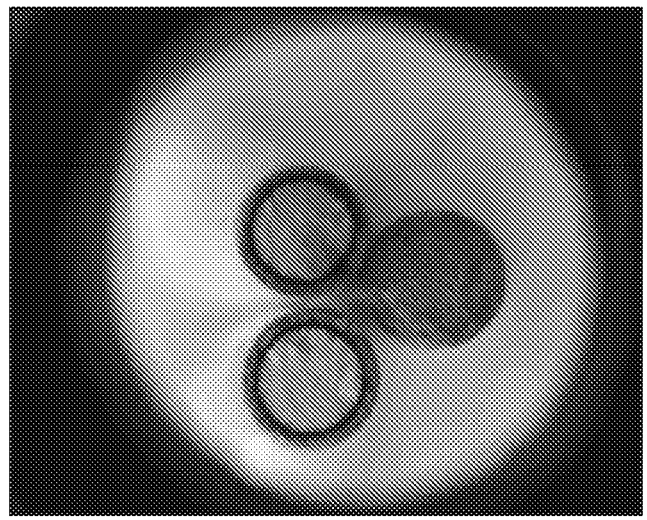

CATALYST FOR SELECTIVE HYDRODESULPHURIZATION OF CRACKED NAPHTHA STREAMS, METHOD OF PREPARATION THEREOF, AND PROCESS FOR SELECTIVE HYDRODESULPHURIZATION OF CRACKED NAPHTHA

FIELD OF THE INVENTION

The present invention relates to a catalyst for selective hydrodesulphurization of cracked naphtha streams, as well as the method for preparing said catalyst and the process for selective hydrodesulphurization of cracked naphtha employing same.

BACKGROUND OF THE INVENTION

Environmental legislation that aims to restrict the emission of atmospheric pollutants has been the motivation for continuous technological development of processes that reduce the levels of precursors of pollutants in streams derived from petroleum. Among the compounds usually present in petroleum and petroleum derivatives, those containing sulphur are one of the main targets of the environmental restrictions.

In this context, the already established technologies of hydrotreating, which are responsible for the decrease in sulphur content mainly in diesel, making a gradual decrease in sulphur content in diesel possible, reaching 10 ppm and even 5 ppm in some countries, deserve special mention. In the case of gasoline, the tolerance is between 50 ppm and 30 ppm.

Sulphur is removed by hydrodesulphurization (HDS) of the sulphur compounds, a reaction that occurs in the presence of hydrogen and a catalyst and involves a series of parallel reactions, such as hydrodenitrogenation (HDN) and hydrogenation of olefins and aromatics (HYD).

Considering the specific case of gasoline, consisting of a set of naphtha streams produced in the refinery, the contribution of the sulphur content of each stream must be taken into account, but there are other quality parameters that must also comply with the specification, for example the octane rating. The octane rating of gasoline is an important specification that is directly related to its efficiency as a fuel for the Otto cycle engine. In this case, the olefins typically present in the naphtha stream produced by Fluid Catalytic Cracking (FCC) are mainly responsible for the octane rating of gasoline, with an average content of olefinic compounds of up to 40% and about 1500 ppm of sulphur.

Therefore during the process of HDS of naphtha from FCC, the parallel reaction of HYD is undesirable, since in this reaction the olefins are hydrogenated, lowering the octane rating of the naphtha stream that will constitute gasoline. For this to be possible, selective catalysts are used, capable of combining a high degree of conversion of sulphur compounds by HDS and a low degree of conversion of olefins by HYD.

The catalysts employed in these processes are preferably sulphides and those of molybdenum (Mo) promoted by cobalt (Co), supported on alumina, aluminas doped with alkali metals or a support with basic characteristics, produced by the method of incipient wetness impregnation. The aim of these catalysts is to remove the sulphur compounds with the minimum hydrogenation of olefins (HYD), so as to limit the loss of octane rating in the treated product.

In this direction, the prior art states that hydrodesulphurization catalysts and processes for desulphurizing naphtha streams endeavour to minimize the saturation of the olefinic compounds.

Documents U.S. Pat. Nos. 4,132,632 and 4,140,626 propose selective CoMo catalysts supported on oxide containing at least 70% of magnesium oxide. Documents U.S. Pat. Nos. 5,340,466, 5,441,630 and 5,459,118A are the first patents with CoMo catalysts using supports based on hydrotalcites of Mg and Al with high specific surface area and pore volume. These catalysts proved to be more selective than CoMo/alumina or CoMo/magnesia-alumina in tests with a model feed. In U.S. Pat. No. 5,851,382, CoMo/hydrotalcite catalysts containing $K_2O$ are prepared in a single step, by mixing the active phase and the support, and are then extruded. These catalysts were found to be more selective than the CoMoK/hydrotalcite+alumina catalysts of the earlier patents. The feed contained about 28% of olefins, 1500 ppm of total sulphur and 20 ppm of total nitrogen compounds. In the patents, the hydrotalcites consist of a divalent metal (Mg) and a trivalent metal such as Al. Examples cited were hydrotalcites of MgAl, CaAl, ZnCr, NiAl, MgFe, NiMg, with carbonate, sulphate or nitrate as the compensating ion. Then catalysts of NiMo and CoMo with a Co(Ni):Mo ratio varying from 1 to 9 were presented in document U.S. Pat. No. 5,358,633, and CoMo catalysts supported on alumina containing group I alkali metals or lanthanides and carbonaceous material in document U.S. Pat. No. 5,423,976. U.S. Pat. No. 5,348,928 claims the production of selective catalysts incorporating manganese and an alkali metal in the extruded CoMo catalyst supported on alumina, silica, titania and mixtures thereof. According to the authors, impregnation with the alkali metals after incorporation of the active phase would be more efficient for neutralizing the more hydrogenating active sites. In fact, addition of alkali metals to the finished catalyst resulted in poisoning of the catalytic sites. In other words, part of the metal added loses its function. The finished catalyst must have specific surface area of not less than 225 $m^2/g$, average pore diameter from 4 to 8 nm, abrasion loss of 2%, and mechanical strength of not less than 3.6 daN for cylindrical extrudates of 1.3 mm.

Patent U.S. Pat. No. 6,692,635 describes a two-stage process for obtaining naphtha with low sulphur content and minimum hydrogenation of olefins. In this process, the catalyst may be a CoMo sulphide supported on alumina, silica, silica-alumina, titania, magnesium oxide or zinc oxide and mixtures thereof, with specific surface area between 25 and 350 $m^2/g$.

Patents U.S. Pat. Nos. 5,985,136 and 6,013,598 claim the production of a selective CoMoS catalyst, supported on alumina, silica or silica-alumina with properties defined as average pore size between 6 and 20 nm, controlled dispersion of Mo that must comply with a distribution between 0.5 and $3.10^{-4}$ g $MoO_3/m^2$, with distribution of sites, measured by chemisorption of $O_2$ with values between 800 and 2800 micromoles of $O_2$/g of $MoO_3$.

It can be deduced from the foregoing that the use of catalysts for hydrodesulphurization of cracked naphtha requires a differentiated formulation, with high selectivity for the reactions of removal of sulphur at the expense of the hydrogenation of olefins. Control of the quantity and type of active sites, as well as of the properties of the supports for these catalysts, are extremely important for this.

Although commercially successful catalysts for hydrodesulphurization are available nowadays, there is still a need for improved catalysts that are able to combine a high level of desulphurization with a minimum of saturation of olefins.

As will be described in more detail below, the present invention meets this existing demand of the prior art in a practical and efficient manner.

SUMMARY OF THE INVENTION

The present invention relates to a catalyst for selective hydrodesulphurization of cracked naphtha streams in the form of an extrudate, which comprises a support based on an inorganic oxide and an outer layer bound to the support, wherein the outer layer comprises desulphurization metals dispersed therein forming a crown.

The present invention thus provides a catalyst for selective hydrodesulphurization of cracked naphtha streams, characterized in that it is in the form of an extrudate and comprises:
 a support based on hydrotalcite; and
 an outer layer bound to said support, which comprises desulphurization metals dispersed therein forming a crown, wherein the desulphurization metals that form the active phase of the extrudate are cobalt and molybdenum, wherein molybdenum is distributed almost uniformly throughout the extrudate and cobalt is absent from the interior of the extrudate and shows a maximum in the inner portion of the crown.

The present invention also relates to preparation of said catalyst by the incipient wetness impregnation method and to the process for selective hydrodesulphurization of cracked naphtha employing same.

The present invention thus provides a method for preparing a catalyst, according to the invention, characterized in that it is incipient wetness impregnation and comprises the following steps:
 obtaining an extrudate of hydrotalcite;
impregnating said extrudate at the wet point with a solution of molybdenum;
 impregnating said extrudate obtained in step b) at the wet point with a solution of cobalt;
 adjusting the pH of the impregnation solution with acid to a value from 1 to 10, preferably from 1 to 5, more preferably 3;
 drying the catalyst obtained in step d) for 1 to 6 hours, preferably for 2 hours, and
 calcining the catalyst obtained in step e) at a temperature between 350 and 600° C., preferably at 450° C., for at least 1 hour.

The present invention further provides a process for selective hydrodesulphurization of a cracked naphtha stream containing olefins without excessive saturation of olefins, characterized in that it comprises:
 reacting a cracked naphtha stream containing olefin in a hydrodesulphurization zone containing the hydrodesulphurization catalyst according to the invention; and
 recovering the naphtha stream having a reduced sulphur concentration.

BRIEF DESCRIPTION OF THE FIGURES

The detailed description presented hereunder refers to the appended figures, representing the embodiments of the present invention.

FIG. 1 shows a top view of samples of CoMo/hydrotalcite extrudates containing Zn (A and C) and CoMo/hydrotalcite catalysts (B) at 60× magnification.

DETAILED DESCRIPTION OF THE INVENTION

Figure 2:
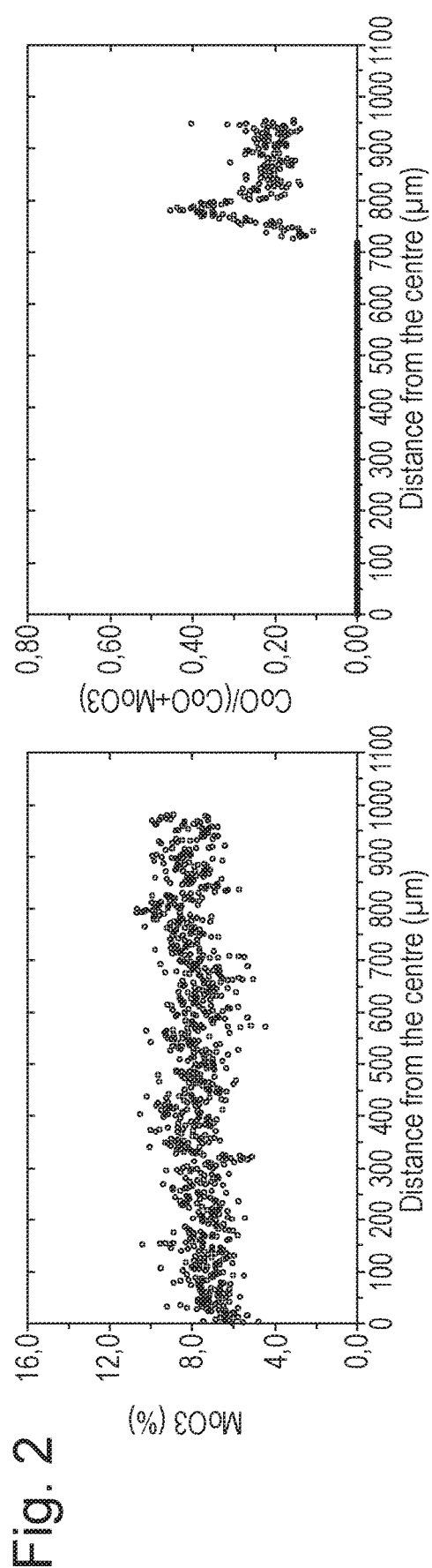
FIG. 2 shows the distribution of the metals (Mo and Co) radially in the extrudate particle used in example 1.

Various hydrodesulphurization catalysts exist in the prior art, but in addition to their capacity for desulphurizing hydrocarbons of higher boiling point than those typically found in naphtha, they hydrogenate any olefins that may be present. Naphtha must be desulphurized for environmental reasons, but the olefins must not be saturated, as they are responsible for the octane rating of gasoline and it is therefore highly desirable to retain the maximum possible concentration of olefins in the desulphurized naphtha. Many of the approaches for desulphurization of naphtha have focused on modifying the conventional hydrofining process using milder operating conditions and catalysts that remove sulphur selectively, but preserve the major part of the olefins.

In connection with this invention, it was observed that the hydrofining catalysts in which the metal charge is restricted to the outer layer of the catalysts are more selective for hydrodesulphurization compared to the hydrogenation reactions of olefins, than the catalysts in which the metal is uniformly distributed throughout the catalyst.

Advantageously, the use of catalysts with said distribution, where the metals are distributed predominantly in the outer layer of the extrudate, promotes quicker contact between the sulphur compounds and the active phase, minimizing the undesirable reactions of excessive hydrogenation of olefins (HYD) and implementing the reactions of hydrodesulphurization (HDS).

Thus, in a first embodiment, the present invention provides a catalyst for selective hydrodesulphurization of cracked naphtha streams in the form of an extrudate, which comprises a support based on an inorganic oxide and an outer layer bound to said support, wherein the outer layer comprises desulphurization metals dispersed therein forming a crown.

The term "crown" is used to describe the region of the catalyst in which the majority of the desulphurization metals are dispersed. The desulphurization metals are concentrated within an outer layer of the extrudate, so the "crown" of desulphurization metals is situated in the exterior portions of the catalyst.

More specifically, the hydrodesulphurization catalyst of the present invention comprises a support based on hydrotalcite. In particular, such supports are obtained starting from lamellar compounds, of the anionic clay type consisting of one or more $M^{+2}$ elements such as manganese, zinc, copper, cobalt or nickel, more preferably manganese, zinc, copper or cobalt and an $M^{+3}$ element such as aluminium, lanthanum, more preferably aluminium. The molar ratio of the elements in the inorganic oxide support based on hydrotalcite may vary.

Even more preferably, magnesium and aluminium are used in the support, wherein the ratio of magnesium to aluminium determines basicity characteristics of these compounds, and an increase in this ratio increases the HDS/HYD selectivity.

The outer layer bound to the support based on hydrotalcite comprises desulphurization metals dispersed therein forming a crown, wherein said metals are preferably cobalt and molybdenum, which are distributed in the extrudate individually.

More specifically, whereas molybdenum is distributed almost uniformly throughout the extrudate, though with a slight increase in distribution towards the crown, cobalt is absent from the interior of the extrudate and shows a maximum in the inner portion of the crown.

Cobalt is generally used in the form of, for example, cobalt nitrate, whereas molybdenum is employed in the form of, for example, a solution of ammonium heptamolybdate or of $MoO_3$.

The content of the active phase in the catalyst is from about 3 to 20 wt % of $MoO_3$, preferably between 8 and 12%, and cobalt, expressed as CoO, with a ratio of the metals $CoO/(CoO+MoO_3)$ between 0.1 and 0.7, preferably 0.2.

In other words, the catalysts have a distribution of metals in the extrudate of the core-shell type (concentration of the metals in the outer layer of the volume of the extrudate), where the thickness of the layer may vary as a function of the contact time with the metal precursors up to a maximum value of thickness of the outer layer of 500 µm.

Thus, the sulphur compounds diffuse and react quickly in the first 100 to 200 µm of the extrudate, so that in the rest of the particle, the molybdenum that is present almost in the absence of cobalt will have little hydrogenating activity, as desired.

The catalysts display good dispersion of the metallic phase, based on the absence of characteristic peaks of the active phase when examined by X-ray diffraction. The textural properties of the support determine the distribution of the active phase, the values of specific surface area measured by $N_2$ adsorption may vary between 100 and 300 m$^2$/g, notably 220 m$^2$/g, with a pore volume between 0.2 and 1 cm$^3$/g, average pore diameter between 4 and 12 nm and size of crystallites between 25 and 55 nm. The catalysts also have good mechanical strength, suitable for processes in fixed-bed reactors.

This distribution of the metals in the extrudate, which endows it with particular properties, may be observed by scanning electron microscopy (SEM) combined with an EDS probe (energy-dispersion X-ray spectroscopy), and the visual appearance of the catalysts can be seen in the accompanying FIG. 1.

In a second embodiment, the present invention relates to the method for preparing said catalyst, which comprises the steps of: a) obtaining an extrudate of hydrotalcite; b) adjusting the pH of the impregnation solution with acid; c) incipient wetness impregnation of said extrudate with a solution of molybdenum; d) incipient wetness impregnation of the extrudate obtained in step c) with a solution of cobalt; e) drying the catalyst obtained in step d); and f) calcination of said catalyst.

In particular, the catalysts of the invention are supported on extrudates that may be cylindrical, trilobe or quadrilobe, preferably starting from a solution of ammonium heptamolybdate or of $MoO_3$, in ammoniacal solution, to which cobalt nitrate is added. The pH of the impregnation solution is adjusted with acid, preferably with concentrated $HNO_3$, and may vary from 1 to 10, preferably from 1 to 5, and is more preferably 3.

The temperature of the impregnation solution is suitably maintained between room temperature and 100° C., preferably it is heated to 60° C.

The concentration of the impregnation solution is such that the finished catalyst has the contents of active phase described above. More specifically, the extrudates are brought into contact with the solution of metals in a mixer of the concrete mixer type at 60° C. for a defined time, between 5 minutes and 1 hour, preferably for 10 minutes. The catalysts obtained are suitably dried at 120° C. for 1 to 6 hours, preferably for 2 hours, and are suitably calcined at between 350 and 600° C., preferably at 450° C. for a further 1 hour.

The method of the invention described above may be carried out in separate steps, but is preferably carried out by simultaneous incipient wetness impregnation, combining steps b) and c).

The catalysts thus obtained display high selectivity in the reaction of hydrodesulphurization of cracked naphtha in runs with $H_2$, pure or diluted with inert material, promoted by the distribution of metals in the extrudate of the core-shell type. The distribution of the metals is controlled by suitable adjustment of the conditions of the step of impregnation of HTC extrudates, thus avoiding the difficulties associated with preparing successive layers of alumina on a non-porous inert support.

In a third embodiment, the present invention relates to the process for selective hydrodesulphurization of cracked naphtha streams containing olefins without excessive saturation of olefins employing the catalyst obtained by the method described herein. Said process comprises the following steps:

(a) reacting a cracked naphtha stream containing olefin in a hydrodesulphurization zone containing the hydrodesulphurization catalyst of the present invention; and (b) recovering the naphtha stream having a reduced sulphur concentration.

As a result, it is possible to obtain a cracked naphtha stream with a high level of desulphurization and with a minimum of saturation of olefins.

The selective catalyst of the present invention is particularly suitable for a heavy naphtha feed containing from about 1000 to 1500 mg/kg of total sulphur, about 26% of total olefins and a high content of nitrogenated compounds, of the order of 200 mg/kg as total nitrogen.

The following examples illustrate the various embodiments of the present invention.

EXAMPLES

The catalysts underwent catalytic assessment in a microreactor unit and in pilot plant. The experimental conditions were as follows: pressure from 15 kgf/cm$^2$ to 30 kgf/cm$^2$, temperature from 250 to 320° C., $H_2$/feed ratio from 200 NL/L to 450 NL/L, LHSV from 1.1 to 4 h$^{-1}$. The operating conditions, temperature and pressure, were selected so that the feed is 100% vaporized in the reactor. The catalyst was used in the form of cylindrical extrudates with a diameter of 1.6 mm.

The feed consisting of 100% of cracked naphtha, with general characteristics as presented in Table 1, contained on average from 700 to 1000 mg/kg of total sulphur, consisting predominantly of compounds of the alkylthiophene and alkylbenzothiophene type, the content of olefins varying between 25 and 45%, from 100 to 220 mg/kg of nitrogenated compounds expressed as total nitrogen, density at 20°/4 from 0.798 to 0.805, initial boiling point from 15 to 70° C. and final boiling point from 250 to 262° C. The catalysts were sulphided with dimethyl disulphide (DMDS) diluted in hydrofined naphtha or from direct distillation, at a concentration of 1% of sulphur. After the sulphiding step, the catalysts underwent the step of stabilization with the test feed, cracked naphtha, for a period of 300 hours.

TABLE 1

Characterization of the heavy cracked naphtha feed, average properties of the samples taken in the runs.

| Property | Unit | Method | Value |
|---|---|---|---|
| Density 20°/4° C. | | ASTM D-4052 | 0.8030 |
| Simulated Distillation (wt %) | | ASTM D-2887 | |
| IBP | (° C.) | | 68.9 |
| 5% | (° C.) | | 80.8 |
| 10% | (° C.) | | 89.7 |
| 20% | (° C.) | | 101.1 |
| 30% | (° C.) | | 113.0 |
| 40% | (° C.) | | 128.0 |
| 50% | (° C.) | | 140.7 |
| 60% | (° C.) | | 158.0 |
| 70% | (° C.) | | 169.1 |
| 80% | (° C.) | | 187.4 |
| 90% | (° C.) | | 206.6 |
| 95% | (° C.) | | 222.5 |
| FBP | (° C.) | | 262.4 |
| Total sulphur | (mg/kg) | ASTM D 5653 | 858 |
| Total nitrogen | (mg/kg) | | 200 |
| Varieties of sulphur compounds | | | |
| Thiols | (wt %) | | 0.3 |
| Sulphides and disulphides | (wt %) | | 0.72 |
| Tetrahydrothiophenes | (wt %) | | 1.5 |
| Thiophene | (wt %) | | 2.3 |
| Alkylthiophenes | (wt %) | | 44.9 |
| Benzothiophene | (wt %) | | 9.1 |
| Alkylbenzothiophenes | (wt %) | | 23.7 |
| Dibenzothiophene | (wt %) | | 0.2 |
| Alkyldibenzothiophenes | (wt %) | | 1.4 |
| not identified | (wt %) | | 15.9 |
| Distribution of Hydrocarbons by SFC | | | |
| Saturates | (wt %) | | 26.5 |
| Olefins | (wt %) | | 26.5 |
| Total aromatics | (wt %) | | 47.0 |

Example 1

Figure 4:
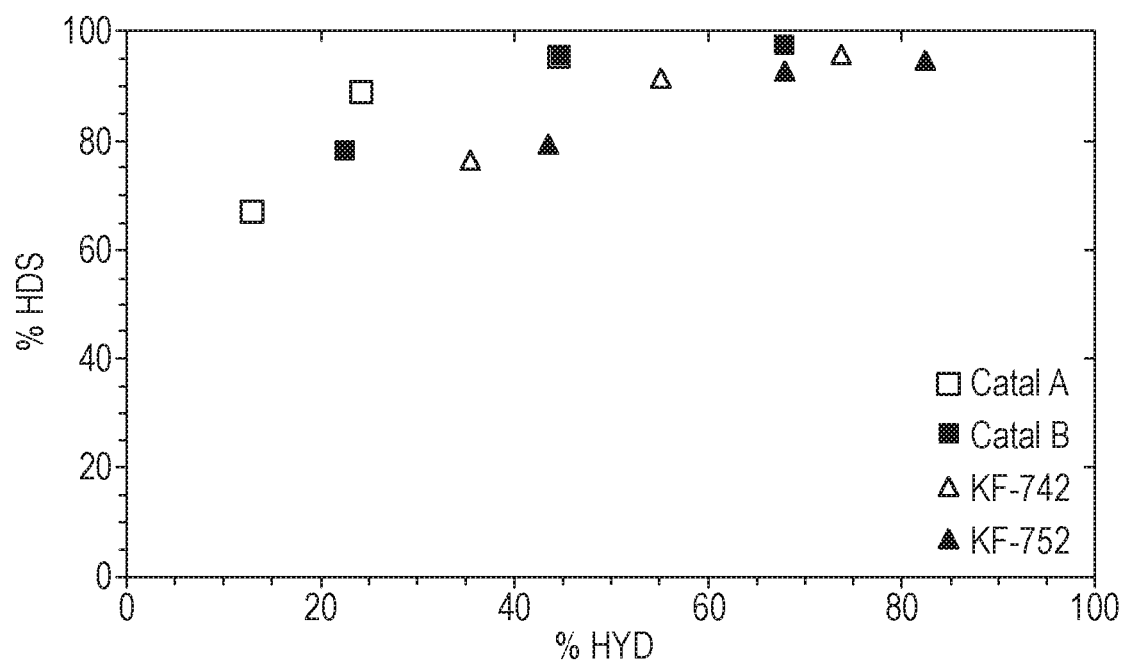
FIG. 4 presents the curve of selectivity of the catalyst used in examples 1 and 2 compared to the commercial catalysts KF-742 and KF-752.

The solution of salts of Mo and Co was added to extrudates of Mg:Al:Zn (1:1.1:0.1 molar) by incipient wetness impregnation for a final concentration of 8% of $MoO_3$ and a ratio $CoO/(CoO+MoO_3)$ of 0.13. In a rotary evaporator, the solution and the catalyst were brought into contact at 60° C. for 10 minutes, then were dried at 120° C. for 2 hours and calcined at 450° C. for 1 hour. The textural properties are presented in Table 2. The active phase of the catalyst is in the core-shell form and the distribution of metals observed by EDS in scanning electron microscopy (SEM) is presented in FIG. 2. Aluminium, magnesium and zinc remain uniformly distributed in the particle. Molybdenum tends to show a slight increase in distribution towards the edge, whereas Co is absent from the interior of the particle and shows a maximum in the inner ring of the crown, as can be seen in FIG. 2. The catalyst thus obtained was submitted to catalytic assessment, with heavy cracked naphtha as feed. The results obtained are presented in Table 3. FIG. 4 shows the curve of selectivity of the catalyst obtained (catalyst A) compared to the commercial catalysts KF-742 and KF-752. The tests with cracked naphtha were carried out at 19 kgf/cm$^2$, LHSV of 2 h$^{-1}$, H$_2$/feed ratio of 200 NL/L.

TABLE 2

Characteristics of the CoMo/hydrotalcite and CoMo/alumina catalysts

| | | Specific surface area (m$^2$/g) | Pore Volume (cm$^3$/g) | Average pore diameter (nm) |
|---|---|---|---|---|
| Example 1 | Cat. A | 154 | 0.36 | 9 |
| Example 2 | Cat. B | 180 | 0.38 | 8 |
| Example 3 | Cat. C | 285 | 0.47 | 7 |
| Example 4 | Cat. D | 256 | 0.51 | 8 |
| Example 5 | Cat. E | 196 | 0.47 | 10 |
| Example 6 | Cat. F | 183 | 0.43 | 9 |

TABLE 3

| Temperature (° C.) | Molar Fraction H$_2$ | HDS (%) | HYD (%) |
|---|---|---|---|
| 280 | 1 | 88.8 | 24.3 |
| 280 | 0.5 | 73.7 | 11.1 |

Example 2

The solution of salts of Mo and Co was added to extrudates of Mg:Al:Zn (1:1.1:0.1 molar), by incipient wetness impregnation for a final concentration of 9% of $MoO_3$ and a ratio $CoO/(CoO+MoO_3)$ of 0.25. In a rotary evaporator, the solution and the catalyst were brought into contact at 60° C. for 10 min, then they were dried at 120° C. for 2 hours and calcined at 450° C. for 1 hour. The textural properties are presented in Table 2 above. The catalyst thus obtained was submitted to catalytic assessment, with heavy cracked naphtha as feed. The results obtained are presented in Table 4. FIG. 4 shows the curve of selectivity of the catalyst obtained (catalyst B) compared to the commercial catalysts KF-742 and KF-752. The tests with cracked naphtha were carried out at 19 kgf/cm$^2$, LHSV of 2 h$^{-1}$, H$_2$/feed ratio of 200 NL/L.

TABLE 4

| Temperature (° C.) | Molar Fraction H$_2$ | HDS (%) | HYD (%) |
|---|---|---|---|
| 280 | 1 | 95.6 | 44.9 |
| 280 | 0.5 | 77.5 | 16.6 |

Example 3

Figure 3:
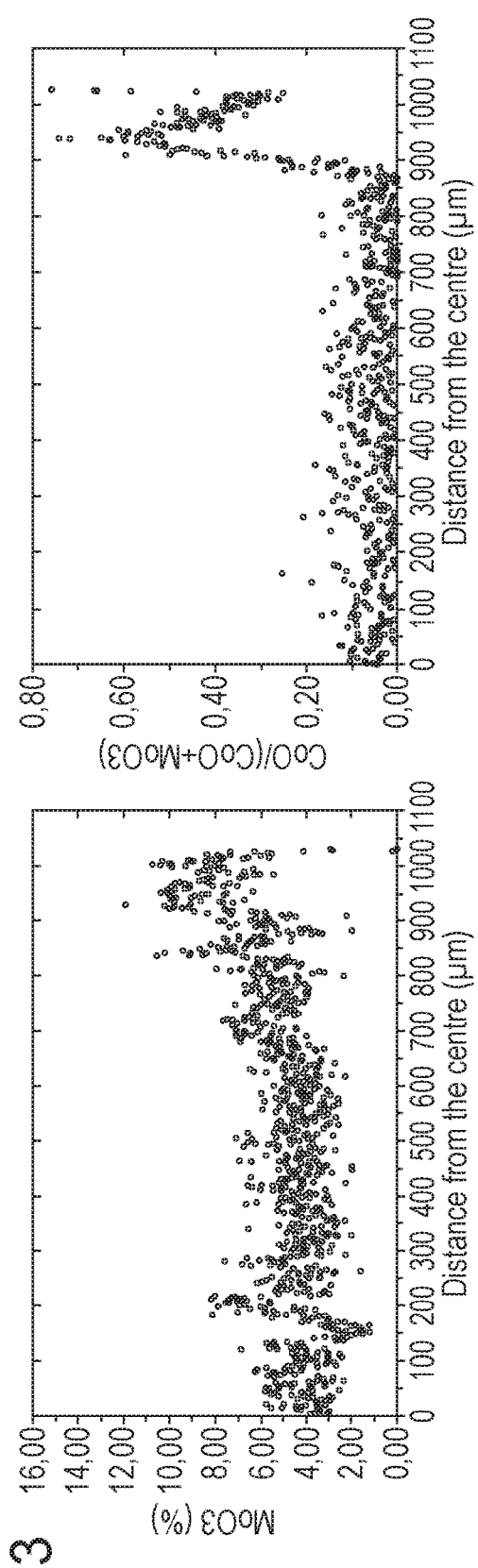
FIG. 3 presents the distribution of the metals (Mo and Co) radially in the extrudate particle of example 3.

The solution of salts of Mo and Co was added to extrudates of Mg:Al (1.1 molar), by incipient wetness impregnation for a final concentration of 12% of $MoO_3$ and a ratio $CoO/(CoO+MoO_3)$ of 0.23. In a rotary evaporator, the solution and the catalyst were brought into contact at 60° C. for 10 min, then they were dried at 120° C. and calcined at 45° C. The textural properties are presented in Table 2 above. The active phase of the catalyst is in the core-shell form and the distribution of metals was observed by EDS in scanning electron microscopy (SEM). Aluminium and magnesium remain uniformly distributed in the particle. Molybdenum tends to show a slight increase in distribution towards the edge, whereas Co is present at very low contents inside the particle and shows a maximum in the inner ring as can be seen in FIG. 3. The catalyst thus obtained was submitted to catalytic assessment, with heavy cracked naphtha as feed. The results obtained are presented in Table 4.

Figure 5:
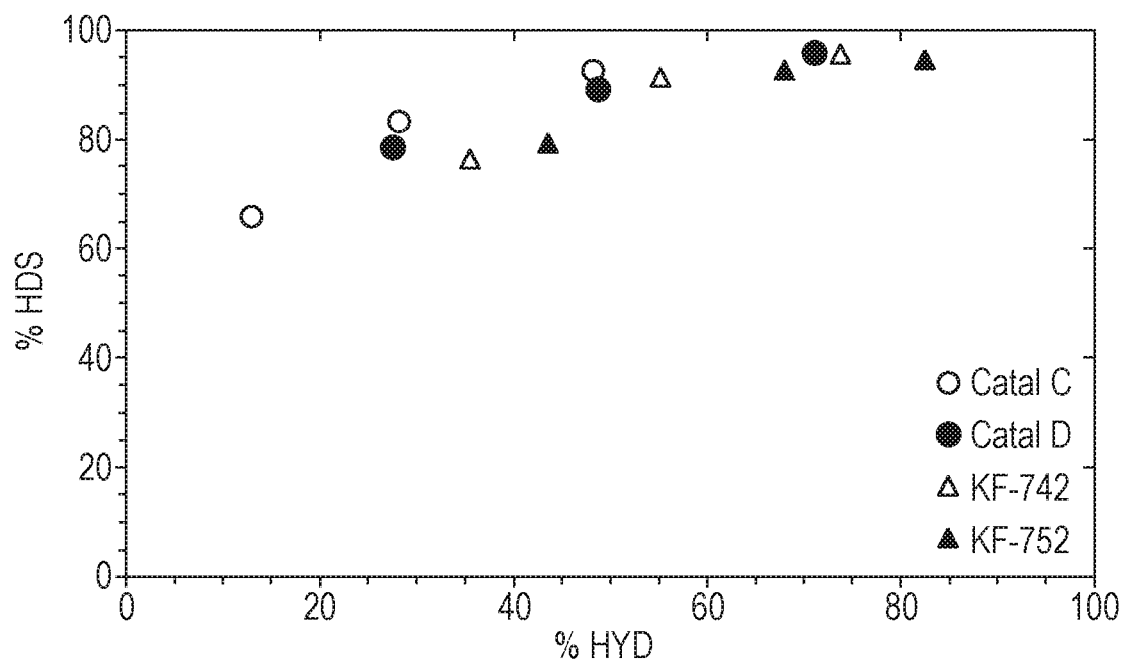
FIG. 5 presents the curve of selectivity of the catalyst used in examples 3 and 4 compared to the commercial catalysts KF-742 and KF-752.

FIG. 5 shows the curve of selectivity of the catalyst obtained (catalyst C) compared to the commercial catalysts KF-742 and KF-752. The tests with cracked naphtha were carried out at 19 kgf/cm², LHSV of 2 h⁻¹, H₂/feed ratio of 200 NL/L.

TABLE 5

| Temperature (° C.) | Molar Fraction $H_2$ | HDS (%) | HYD (%) |
|---|---|---|---|
| 280 | 1 | 83.3 | 28.3 |
| 280 | 0.5 | 68.1 | 10.6 |

Example 4

The solution of salts of Mo and Co was added to extrudates of Mg:Al (0.45 molar), by incipient wetness impregnation for a final concentration of 12% of $MoO_3$ and a ratio $CoO/(CoO+MoO_3)$ of 0.23. In a rotary evaporator, the solution and the catalyst were brought into contact at 60° C. for 10 min, then they were dried at 120° C. and calcined at 450° C. The textural properties are presented in Table 2 above. The catalyst thus obtained was submitted to catalytic assessment, with heavy cracked naphtha as feed. The results obtained are presented in the Table Table 6. FIG. 5 shows the curve of selectivity of the catalyst obtained (catalyst D) compared to the commercial catalysts KF-742 and KF-752. The tests with cracked naphtha were carried out at 19 kgf/cm², LHSV of 2 h⁻¹, Hz/feed ratio of 200 NL/L.

Example 5

TABLE 6

| Temperature (° C.) | Molar Fraction $H_2$ | HDS (%) | HYD (%) |
|---|---|---|---|
| 280 | 1 | 89.1 | 48.8 |
| 280 | 0.5 | 79.9 | 23.0 |

Figure 6:
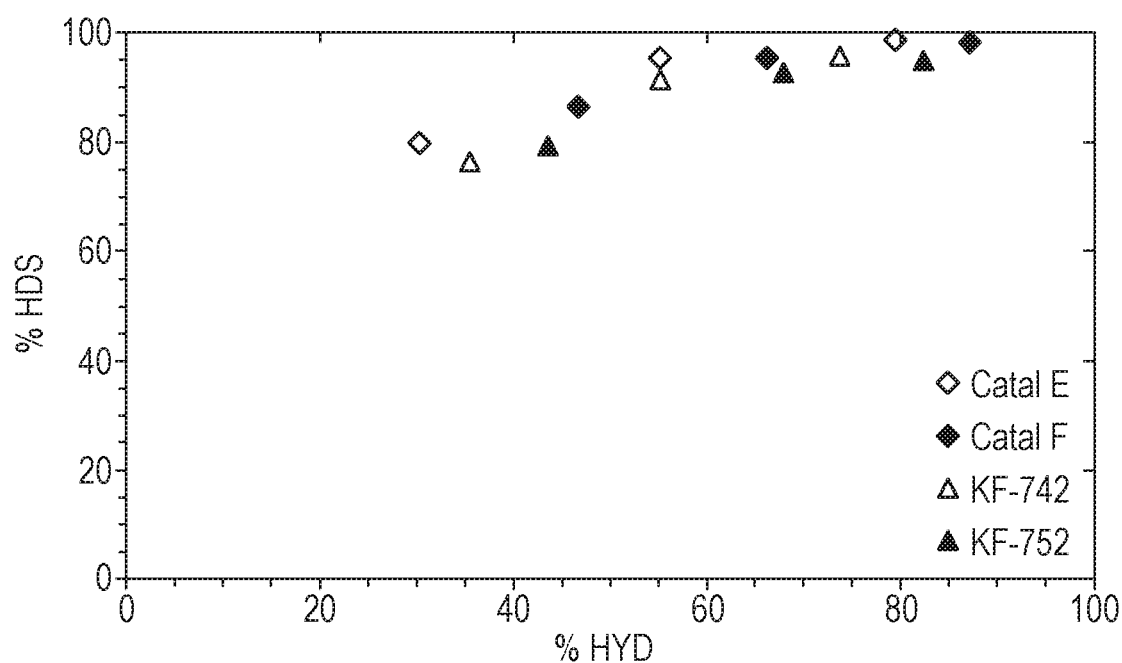
FIG. 6 presents the curve of selectivity of the catalyst used in examples 5 and 6 compared to the commercial catalysts KF-742 and KF-752.

The solution of salts of Mo and Co was added to extrudates of alumina, by incipient wetness impregnation for a final concentration of 12% of $MoO_3$ and a ratio $CoO/(CoO+MoO_3)$ of 0.23. In a rotary evaporator, the solution and the catalyst were brought into contact at 60° C. for 10 min, then they were dried at 120° C. and calcined at 450° C. The textural properties are presented in Table 2 above. The catalyst thus obtained was submitted to catalytic assessment, with heavy cracked naphtha as feed. The results obtained are presented in the Table. FIG. 6 shows the curve of selectivity of the catalyst obtained (catalyst E) compared to the commercial catalysts KF-742 and KF-752. The tests with cracked naphtha were carried out at 19 kgf/cm², LHSV of 2 h⁻¹, H₂/feed ratio of 200 NL/L.

TABLE 7

| Temperature (° C.) | Molar Fraction $H_2$ | HDS (%) | HYD (%) |
|---|---|---|---|
| 280 | 1 | 95.3 | 55.0 |
| 280 | 0.5 | 92.6 | 28.5 |

Example 6

The solution of salts of Mo and Co was added to extrudates of alumina, by incipient wetness impregnation for a final concentration of 8% of $MoO_3$ and a ratio $CoO/(CoO+MoO_3)$ of 0.3. In a rotary evaporator, the solution and the catalyst were brought into contact at 60° C. for 10 min, then they were dried at 120° C. and calcined at 450° C. The textural properties are presented in Table 2. The catalyst thus obtained was submitted to catalytic assessment, with heavy cracked naphtha as feed. The results obtained are presented in the Table. FIG. 6 shows the curve of selectivity of the catalyst obtained (catalyst F) compared to the commercial catalysts KF-742 and KF-752. The tests with cracked naphtha were carried out at 19 kgf/cm², LHSV of 2 h⁻¹, H₂/feed ratio of 200 NL/L.

TABLE 8

| Temperature (° C.) | Molar Fraction $H_2$ | HDS (%) | HYD (%) |
|---|---|---|---|
| 280 | 1 | 95.3 | 55.0 |
| 280 | 0.5 | 94.3 | 37.0 |

Example 7

A commercial CoMo catalyst, KF-742, was also assessed, for comparison. The results obtained are presented in the Table. FIGS. 4 to 6 show the curve of selectivity of this commercial catalyst in comparison with the catalysts according to the invention.

TABLE 9

| Temperature (° C.) | Molar Fraction $H_2$ | HDS (%) | HYD (%) |
|---|---|---|---|
| 280 | 1 | 91.5 | 55.2 |
| 280 | 0.5 | 84.5 | 33.5 |

Example 8

A commercial CoMo catalyst, KF-752, was also assessed for comparison. The results obtained are presented in Table 9. FIGS. 4 to 6 show the curve of selectivity of this commercial catalyst in comparison with the catalysts according to the invention.

TABLE 10

| Temperature (° C.) | Molar Fraction $H_2$ | HDS (%) | HYD (%) |
|---|---|---|---|
| 280 | 1 | 92.8 | 68.0 |
| 280 | 0.5 | 91.5 | 40.8 |

As may be deduced from the examples described above, the CoMo catalysts supported on hydrotalcite with distribution of metals in the extrudate of the core-shell type of the present invention have higher activity and selectivity than the commercially available reference catalysts. As a result, using these in processes of hydrodesulphurization of cracked naphtha streams produces a high level of desulphurization of the cracked naphtha with a minimum of saturation of olefins.

Thus, it is possible to reduce the concentration of sulphur in the cracked naphtha streams and consequently the emission of sulphur dioxide ($SO_2$) that results from the use of automotive fuels rich in organosulphur compounds, but without significantly affecting the octane rating of the product, since there is minimal hydrogenation of olefins present in the fuels.

Numerous variations falling within the scope of protection of the present application are permitted. This reinforces the fact that the present invention is not limited to the particular configurations/embodiments described above.

The invention claimed is:

1. A catalyst for selective hydrodesulphurization of cracked naphtha streams, wherein the catalyst is in the form of an extrudate and comprises:
   (i) a support based on hydrotalcite that additionally comprises one or more $M^{+2}$ elements selected from manganese, zinc, copper, cobalt or nickel and an $M^{+3}$ element selected from aluminium or lanthanum; and
   (ii) an outer layer bound to said support, which comprises desulphurization metals dispersed therein forming a crown, wherein the desulphurization metals that form an active phase of the extrudate are cobalt and molybdenum, wherein molybdenum is distributed throughout the extrudate and cobalt is absent from the interior of the extrudate and shows a maximum in the inner portion of the crown.

2. Catalyst according to claim 1, wherein the support based on hydrotalcite comprises magnesium, aluminium, lanthanum, manganese, copper and/or zinc.

3. Catalyst according to claim 1, wherein the content of the active phase in the catalyst is from 3 to 20 wt % of $MoO_3$ and cobalt, expressed as CoO, based upon the weight of the catalyst, and maintains a ratio of the metals CoO/(CoO+$MoO_3$) between 0.1 and 0.7.

4. Catalyst according to claim 1, wherein the thickness of the outer layer comprising the active phase is up to 500 μm.

5. Catalyst according to claim 1, wherein the support comprises a value of specific surface area measured by $N_2$ adsorption between 100 and 300 $m^2/g$, a pore volume between 0.2 and 1 $cm^3/g$, an average pore diameter between 4 and 12 nm and size of crystallites between 25 and 55 nm.

6. Catalyst according to claim 1, wherein the content of the active phase in the catalyst is from 8 to 12 wt % of $MoO_3$ and cobalt, expressed as CoO, based upon the weight of the catalyst, and maintains a ratio of the metals CoO/(CoO+$MoO_3$) of 0.2.

7. Catalyst according to claim 1, wherein the support comprises a value of specific surface area measured by $N_2$ adsorption of 220 $m^2/g$.

8. A method for preparing a catalyst, as defined in claim 1, wherein the method is incipient wetness impregnation and comprises the following steps:
   a) obtaining an extrudate of hydrotalcite;
   b) impregnating said extrudate at the wet point with a solution of molybdenum;
   c) impregnating said extrudate obtained in step b) at the wet point with a solution of cobalt;
   d) adjusting the pH of the impregnation solution with acid to a value from 1 to 5;
   e) drying the catalyst obtained in step d) for 1 to 6 hours, and
   f) calcining the catalyst obtained in step e) at a temperature between 350 and 600° C., for at least 1 hour.

9. Method according to claim 8, wherein the temperature of the impregnation solution is maintained between room temperature and up to 100° C., preferably 60° C., for a period of 5 minutes to 1 hour.

10. Method according to claim 8, wherein the pH of the impregnation solution is adjusted to 3 and its temperature is maintained at 60° C., for a period of 10 minutes.

11. A method for preparing a catalyst, as defined in claim 1, wherein the method is incipient wetness impregnation and comprises the following steps:
   a) obtaining an extrudate of hydrotalcite;
   b) impregnating said extrudate at the wet point with a solution of molybdenum and a solution of cobalt simultaneously;
   c) adjusting the pH of the impregnation solution with acid to a value from 1 to 5;
   d) drying the catalyst obtained in step d) for 1 to 6 hours, and
   e) calcining the catalyst obtained in step e) at a temperature between 350 and 600° C. for at least 1 hour.

12. Method according to claim 11, wherein the temperature of the impregnation solution is maintained between room temperature and up to 100° C., for a period of 5 minutes to 1 hour.

13. Method according to claim 11, wherein the pH of the impregnation solution is adjusted to 3 and its temperature is maintained at 60° C., for a period of 10 minutes.

14. A method for preparing a catalyst, as defined in claim 1, wherein the method is incipient wetness impregnation and comprises the following steps:
   a) obtaining an extrudate of hydrotalcite;
   b) impregnating said extrudate at the wet point with a solution of molybdenum;
   c) impregnating said extrudate obtained in step b) at the wet point with a solution of cobalt;
   d) adjusting the pH of the impregnation solution with acid to a value from 1 to 5;
   e) drying the catalyst obtained in step d) for 1 to 6 hours, and
   f) calcining the catalyst obtained in step e) at a temperature between 350 and 600° C. for at least 1 hour,
   wherein the temperature of the impregnation solution is maintained between 60° C. and 100° C. for a period of 5 to 10 minutes.

15. A process for selective hydrodesulphurization of a cracked naphtha stream containing olefins, wherein the process comprises:
   (a) reacting a cracked naphtha stream containing olefin in a hydrodesulphurization zone containing the hydrodesulphurization catalyst defined in claim 1; and
   (b) recovering the naphtha stream having a reduced sulphur concentration.

* * * * *